United States Patent
Jung et al.

(10) Patent No.: US 8,912,481 B2
(45) Date of Patent: Dec. 16, 2014

(54) REFLECTIVE DISPLAY INCLUDING AN INTEGRAL MOTION SENSING SWITCH

(75) Inventors: He Won Jung, Ansan (KR); Jun Sam Choi, Ansan (KR)

(73) Assignee: Hysonic Co., Ltd. (KR)

( * ) Notice: Subject to any disclaimer, the term of this patent is extended or adjusted under 35 U.S.C. 154(b) by 173 days.

(21) Appl. No.: 13/547,395

(22) Filed: Jul. 12, 2012

(65) Prior Publication Data
US 2013/0043928 A1 Feb. 21, 2013

(30) Foreign Application Priority Data

Aug. 19, 2011 (KR) .................. 10-2011-0083039

(51) Int. Cl.
- *G06M 7/00* (2006.01)
- *H01J 40/14* (2006.01)
- *G06F 3/03* (2006.01)
- *G06F 3/042* (2006.01)

(52) U.S. Cl.
CPC ............ *G06F 3/0304* (2013.01); *G06F 3/0421* (2013.01)
USPC ........................................ 250/221; 250/239

(58) Field of Classification Search
CPC ............... G01S 7/04; G01S 7/10; G01S 7/14; G01S 7/24; G01S 7/415; G01S 7/629
USPC ............ 250/205, 203.2, 203.3, 206.1, 206.2, 250/221, 239; 348/52–54, 191, 751, 761, 348/766, 790, 94–95, 154–155, 158; 359/13, 212, 242, 277; 345/44, 84, 345/214, 166, 169, 173, 215; 200/61.02, 200/61.52; 455/95, 128, 566, 575.1; 349/41, 58, 62

See application file for complete search history.

(56) References Cited

U.S. PATENT DOCUMENTS 8,304,733 B2 * 11/2012 Alameh et al. ................ 250/349
2013/0335387 A1 * 12/2013 Emerton et al. .............. 345/207

* cited by examiner

*Primary Examiner* — Georgia Y Epps
*Assistant Examiner* — Don Williams
(74) *Attorney, Agent, or Firm* — Cantor Colburn LLP

(57) ABSTRACT

Disclosed is a motion detection switch, and more particularly a motion detection switch which can recognize motion of a reflector moved at an upper side of a display part of a mobile phone, and can control the mobile phone without any touching operation. The motion detection switch recognizes motion of a reflection body moved at an upper side of a display part of a portable terminal and controls the portable terminal, including a base which is disposed at an upper side of a main body of the portable terminal having the display part, which is outside the display part; a light receiving device which is disposed at the base; a plurality of light emitting devices which are disposed at the base so as to be symmetric with respect to the light receiving device; and a control device which operates the light emitting devices.

2 Claims, 7 Drawing Sheets

(a)

(b)

REFLECTIVE DISPLAY INCLUDING AN INTEGRAL MOTION SENSING SWITCH

CROSS-REFERENCE(S) TO RELATED APPLICATIONS

The present invention claims priority of Korean Patent Application No. 10-2011-0083039, filed on Aug. 19, 2011, which is incorporated herein by reference.

BACKGROUND OF THE INVENTION

1. Field of the Invention

The present invention relates to a motion sensing switch, and more particularly, to a motion sensing switch which can recognize motion of a reflection body moving on a display part of a portable terminal and thus can control the portable terminal without any touching.

2. Description of Related Art

As an electronic communication technology is developed, a portable terminal such as a mobile phone and a PDA becomes one of the necessities in modern society. The portable terminal has been improved to have a new special function and to be easily operated, thereby attracting consumer's eyes.

Recently, the portable terminal provides various functions such as an Internet accessing function, a game function as well as a communication function and also has a plurality of key buttons which can select and control the various functions.

Further, the various functions of the portable terminal can be controlled by screen-touching.

Since the portable terminal has a small size in order to provide mobility and portability, the number of key buttons is limited.

Therefore, when a user is under behavioral restrictions, for example, when the user is moving or driving, it is very difficult to perform an input motion due to the touching of the key buttons or the screen of the portable terminal.

To solve the problems, there has been proposed a technology having a control function operated by sensing motion of a user, which can control functions of a portable terminal through a non-contact type operation without directly contacting with an input unit such as a key pad.

A non-contact type control device with the control function can be also applied to various fields such as an interface device, a motion recognition game, a vehicle panel and a kitchen appliance.

In order to improve a recognition rate and responsibility the motion, the non-contact type control device has to have a large size.

In other words, in order to effectively embody the non-contact type control device, it is necessary that a distance between sensors for sensing the motion is spaced apart from each other.

Therefore, if the non-contact type control device has a large size, the distance between sensors for sensing the motion is far apart from each other, and thus it is facile to sense the motion from a long distance away.

However, since it is difficult to install the non-contact type control device in a small-sized apparatus such as a mobile phone, a bezel of a navigation system and a case of a switch, it is necessary for the non-contact type control device to be miniaturized.

However, if the non-contact type control device is miniaturized, a distance between sensors becomes short, and thus the motions are not sensed from a long distance away or it is not possible to sensitively respond to a control operation, thereby being inconvenient in controlling the various small-sized apparatuses.

Recently, a portable terminal having a wide display part, such a tablet PC and a PDA is being used widely.

The portable terminal such as the PC tablet has to have the side display part and also to be capable of being facilely portable.

Since a small-sized and modularized non-contact type control device is required, but the display part formed to be wide, as described above, if the non-contact type control device is disposed at a bezel portion of the portable terminal, it is difficult to sense the motion of an object located at an upper side of the display part. Therefore, in order to control the portable terminal in the non-contact type, the control motion has to be performed on the bezel portion of the portable terminal.

Such the control operation deteriorates feeling in directly controlling output contents or icons output through the display part, and also since a position which is watched by a user is different from that in which the control operation is performed, it is inconvenient to operate it in comparison with the performing of the control operation on the display part.

SUMMARY OF THE INVENTION

An embodiment of the present invention is directed to providing a motion sensing switch which can miniaturize a portable terminal by modularizing the motion sensing switch, and also can have a high recognition rate with respect to external motion from a long distance away and also can sensitively respond to the external motion, thereby being convenient in controlling various apparatuses.

To achieve the object of the present invention, the present invention provides a motion sensing switch which recognizes motion of a reflection body moved at an upper side of a display part of a portable terminal and controls the portable terminal, including a base which is disposed at an upper side of a main body of the portable terminal having the display part, which is outside the display part; a light receiving device which is disposed at the base; a plurality of light emitting devices which are disposed at the base so as to be symmetric with respect to the light receiving device; and a control device which operates the light emitting devices, wherein the light receiving device is disposed to be inclined toward the display part, and the light receiving device senses light emitted from the light emitting devices and reflected by the reflection body and transfers an operation signal to the control device, and the light emitting devices are disposed to be inclined in an opposite direction to the light receiving device, and the control device receives the operation signal and recognizes motion of the reflection body.

Preferably, the portable terminal is formed with a mounting groove in which the base is inserted, and the base comprises a first base which is inserted into the mounting groove and formed with a first inclined portion formed thereon to be inclined downward toward the display part; a second base which is installed at the first inclined portion and which has a through-hole formed at a center portion thereof and a second inclined portion formed around the through-hole to be inclined in an opposite direction to the through-hole; and a circuit board which is disposed between the first and second bases and on which the light receiving device is mounted, and the light receiving device is disposed at a lower side of the through-hole so as to sense the light emitted from the light emitting device through the through-hole, and the light emitting device is coupled to the second inclined portion and disposed to be inclined in an opposite direction to the light receiving device.

Preferably, the second inclined portion is provided at four positions and disposed around the through-hole to be arranged at an angular interval of 90°.

DETAILED DESCRIPTION OF MAIN DEVICES

| | |
|---|---|
| 10: main body | 11: mounting groove |
| 20: display part | 30: cover member |
| 100: base | 110: first base |
| 111: first inclined portion | |
| 120: second base | 121: through-hole |
| 122: light transmittance cover | |
| 123: second inclined portion | |
| 124: coupling hole | 130: circuit board |
| 300: light emitting device | |
| 300a: first light emitting device | |
| 300b: second light emitting device | |
| 300c: third light emitting device | |
| 300d: fourth light emitting device | |
| 400: compensation device | |

DESCRIPTION OF SPECIFIC EMBODIMENTS

The advantages, features and aspects of the invention will become apparent from the following description of the embodiments with reference to the accompanying drawings, which is set forth hereinafter.

Figure 1:
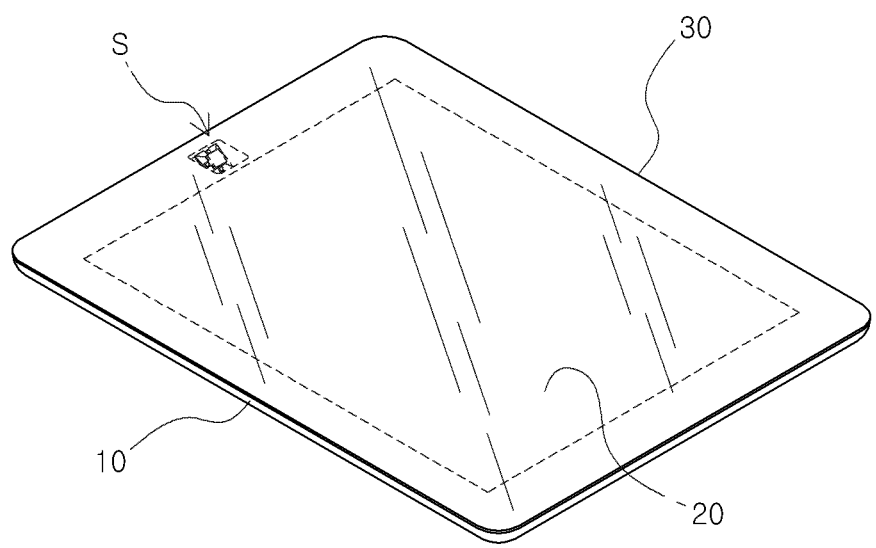
FIG. 1 is a perspective view of a portable terminal equipped with a motion sensing switch according to an embodiment of the present invention.
Figure 2:
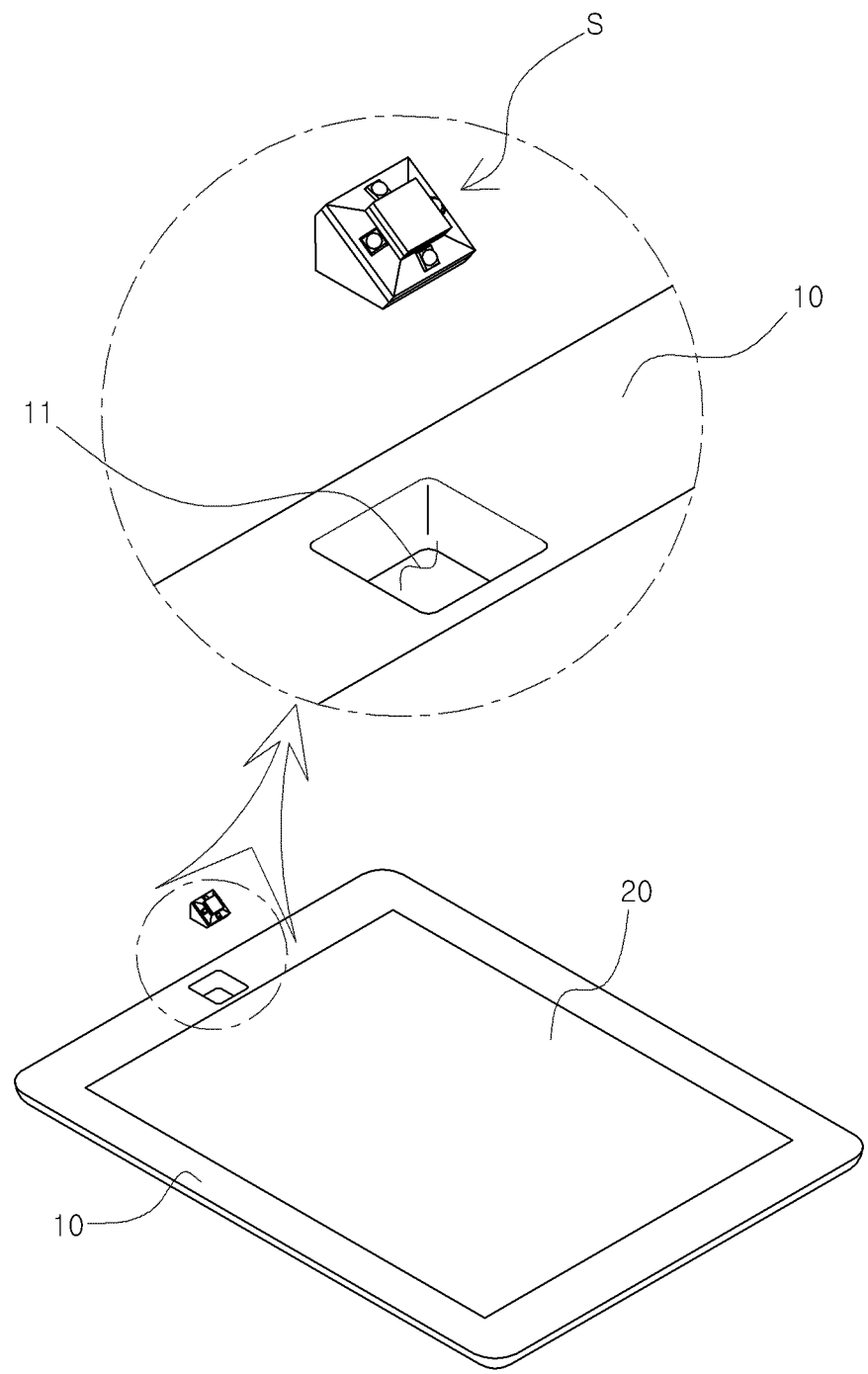
FIG. 2 is an exploded perspective view of the motion sensing switch according to the embodiment of the present invention.
Figure 3:
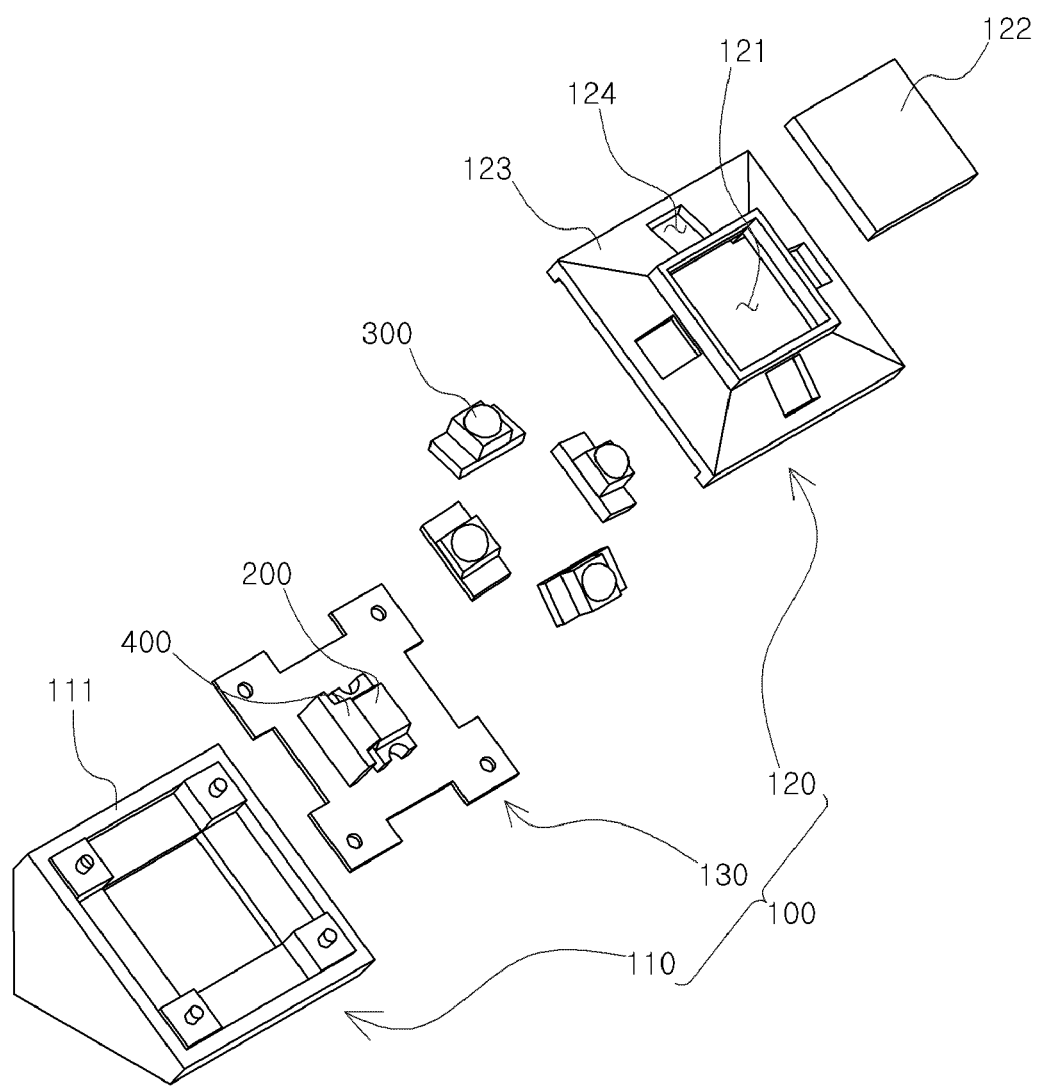
FIG. 3 is an exploded perspective view of the motion sensing switch according to the embodiment of the present invention.
Figure 4:
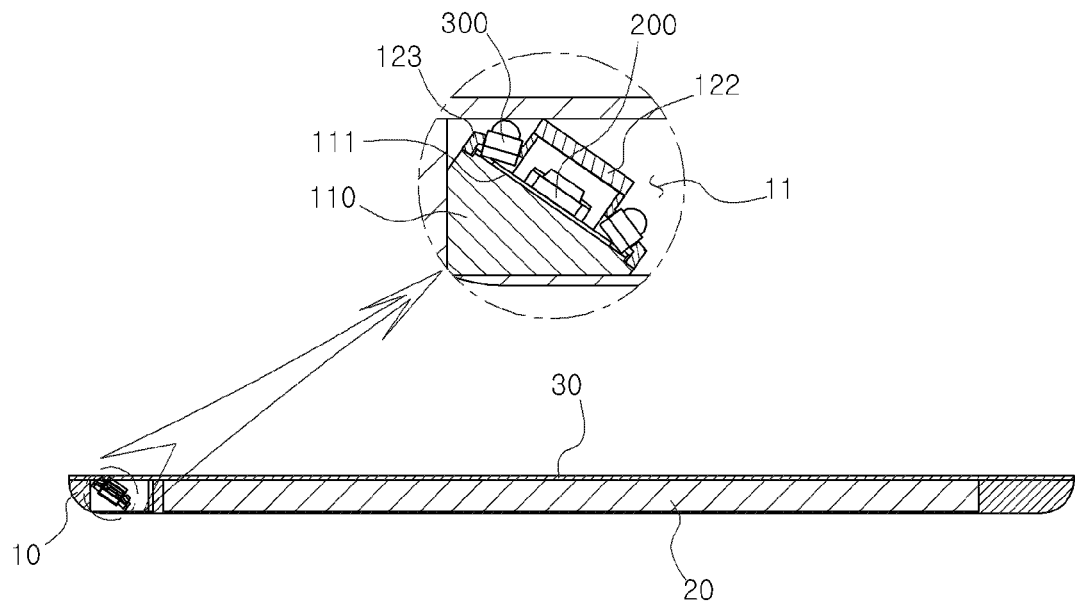
FIG. 4 is a view when seeing in a vertical direction of a circuit board according to the embodiment of the present invention.
Figure 5:
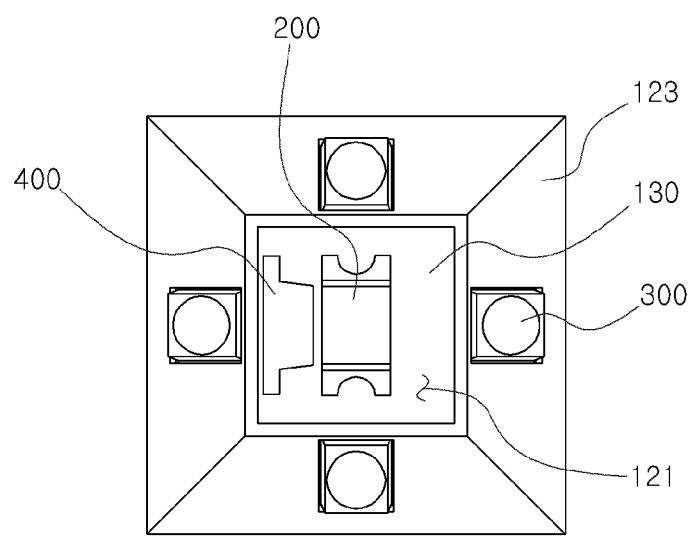
FIG. 5 is a cross-sectional view taken along a line A-A of FIG. 1.
Figure 6:
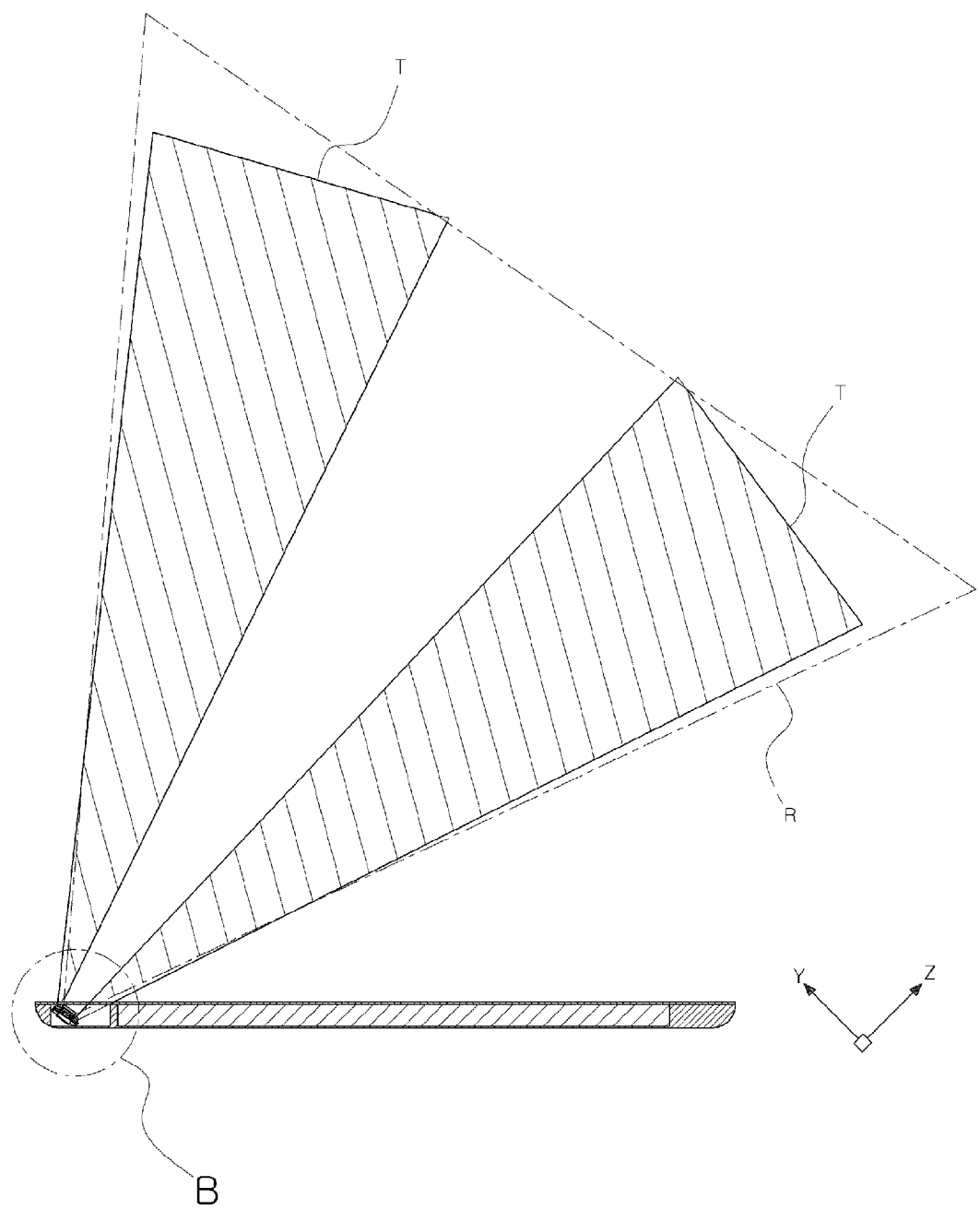
FIG. 6 is a view showing simplified light receiving range and light emitting range of a light receiving device and a light emitting device.
Figure 7:
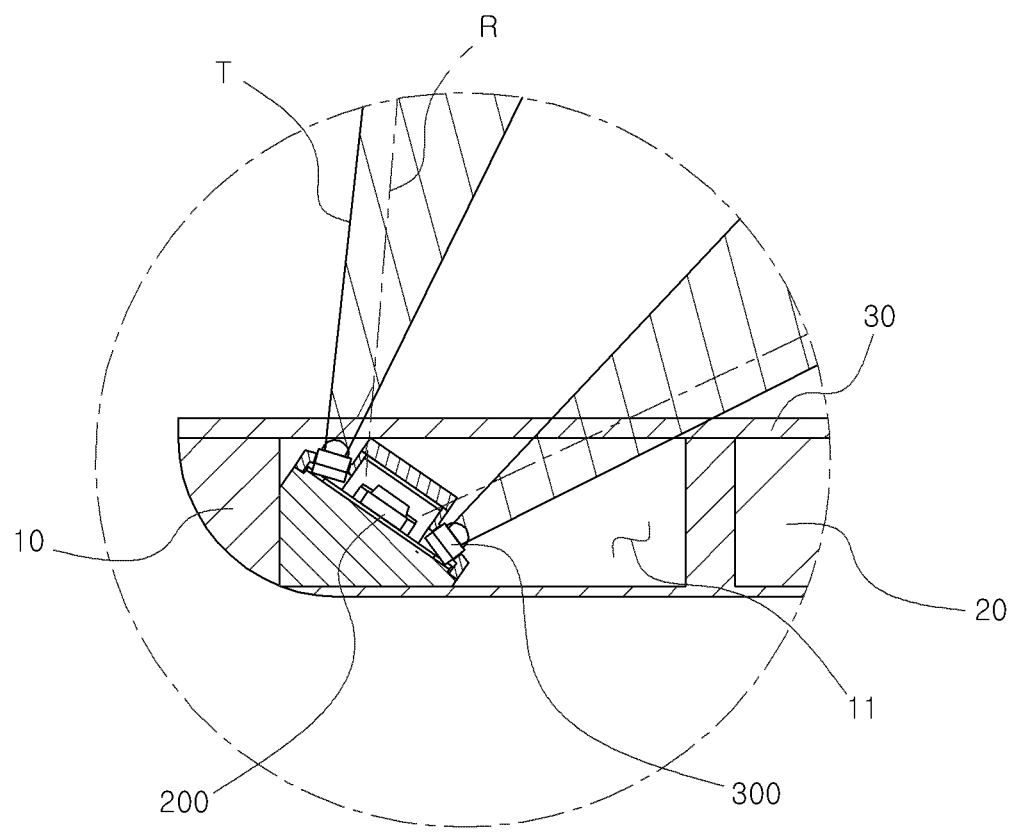
FIG. 7 is an enlarged view of a B portion of FIG. 6.
Figure 8:
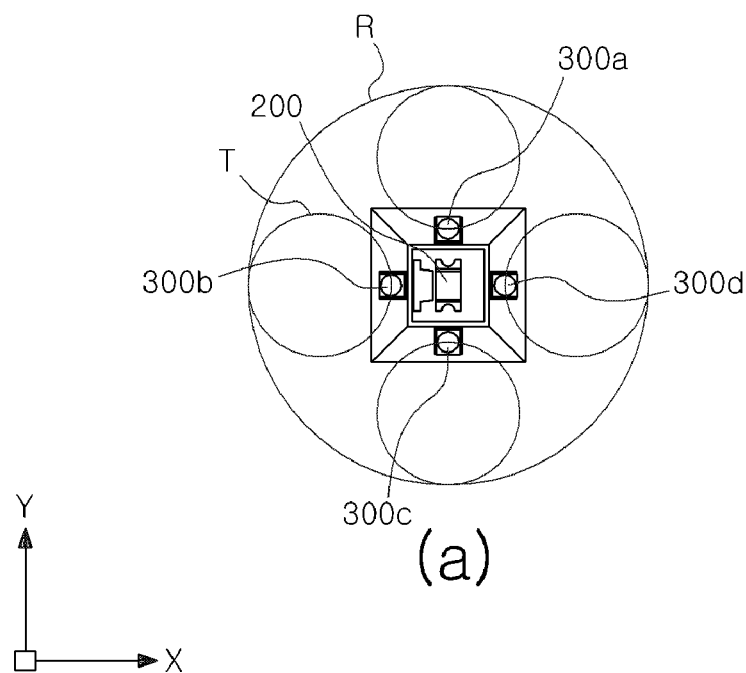
FIG. 8 is a view when seeing in a z-axial direction of FIG. 6.
Figure 8:
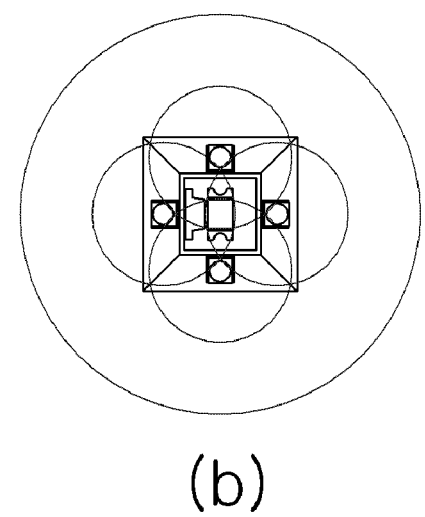

FIG. 1 is a perspective view of a portable terminal equipped with a motion sensing switch according to an embodiment of the present invention, FIG. 2 is an exploded perspective view of the motion sensing switch according to the embodiment of the present invention, FIG. 3 is an exploded perspective view of the motion sensing switch according to the embodiment of the present invention, FIG. 4 is a view when seeing in a vertical direction of a circuit board according to the embodiment of the present invention, FIG. 5 is a cross-sectional view taken along a line A-A of FIG. 1, FIG. 6 is a view showing simplified light receiving range and light emitting range of a light receiving device and a light emitting device, FIG. 7 is an enlarged view of a B portion of FIG. 6, and FIG. 8 is a view when seeing in a z-axial direction of FIG. 6.

As shown in FIGS. 1 to 7, the motion sensing switch S according to the embodiment of the present invention includes a base 100, a light receiving device 200, a light emitting device 300, a compensation device 400 and a control device (not shown).

The base 100 is installed at a portable terminal such as a tablet PC and a PDA.

The tablet PC or the PDA has a wider display part 20 than a conventional portable terminal, and thus it is more portable than a notebook PC and also provides convenience to a user due to its wide display part 20.

Further, the base 100 may be also installed at a general portable terminal having a small display part 20 or other various electronic apparatuses.

As shown in FIGS. 1 and 2, a mounting groove 11 is formed at an external side of the display part 20 which is located at an upper portion of a main body of the portable terminal.

That is, the mounting groove is formed at a front surface of the portable terminal, on which the display part 20 is provided.

A cover member 30 formed of a transparent material is provided on the main body 10 so as to cover the mounting groove and the display part 20.

FIG. 2 shows an exploded perspective view of the motion sensing switch S and the portable terminal, wherein the cover member 30 for covering the front surface of the portable terminal is not shown.

The base 100 is inserted into the mounting groove 11 so as to be disposed at the upper portion of the portable terminal which is located at the external side of the display part 20.

As shown in FIG. 3, the base 100 includes a first base 110, a second base 120 and a circuit board 130.

As shown in FIGS. 3 and 4, the first base 110 is inserted into the mounting groove 11, and a first inclined portion 111 which is inclined toward the display part 20 is formed at an upper portion of the first base 110.

In necessary, the first inclined portion 111 may be not formed separately. Instead, a bottom surface of the mounting groove 11 may be formed to be inclined downwardly toward the display part 20 so that the first base 110 can be inclinedly disposed.

The second base 120 is mounted on the inclined portion and disposed in the mounting groove 11.

As shown in FIG. 3, a through-hole 121 is formed at a center portion of the second base 120.

As described later, the light receiving device 200 receives light emitted from the light emitting device 300 and reflected from a reflection body (not shown) through the through-hole 121.

A light transmittance cover 122 is disposed on the through-hole 121.

A second inclined portion 123 is formed around the through-hole 121 of the second base 120 so as to be inclined in an opposite direction to the through-hole 121.

More detailedly, four second inclined portions 123 are disposed around the through-hole 121 to be arranged at an angular interval of 90°.

The second inclined portions 123 are formed to be inclined at the same angle toward external sides of the through-hole 121.

A coupling hole 124 which is passed through the second inclined portion 123 is formed in the second inclined portion 123.

The light emitting device 300 is coupled in the coupling hole 124 so as to be arranged in an opposite direction to the light receiving device 200.

The circuit board 130 is disposed between the first and second bases 110 and 120, and the light receiving device 200 mounted thereon.

Further, the compensation device 400 is disposed on the circuit board 130.

The light receiving device 200 and the compensation device 400 are disposed at a lower side of the through-hole 121.

The circuit board 130 is electrically connected with the light receiving device 200, the compensation device 400 and the light emitting device 300.

The light receiving device 200 is mounted on the base 100.

In other words, the light receiving device 200 is mounted on the circuit board 130 and disposed at the lower side of the through-hole 121 so as to sense the light emitted from the light emitting device 300 and reflected by the reflection body through the through-hole 121.

And the light receiving device 200 senses the light reflected from the reflection body and then transfers operation signal to the control device.

Detailedly, the light receiving device 200 is a photodiode which generates a current when sensing the light.

The current generated from the light receiving device 200 is transferred to the control device and functions as the operation signal for determining movement of the reflection body.

As shown in FIG. 4, the light receiving device 200 is disposed to be inclined toward an upper side of the display part 20, such that the light reflected from the reflection body (not shown) moved on the display part 20 can be sensed.

The light emitting device 300 is disposed at the base 100, i.e., the second inclined portion 123 so as to be symmetric with respect to the light receiving device 200.

Detailedly, the light emitting device 300 is coupled in the coupling hole 124 formed in each of the four second inclined portions 123 and disposed so as to be inclined in the opposite direction to the light receiving device 200.

And each light emitting device 300 is disposed to be inclined at the same angle.

As shown in FIGS. 6 and 7, the light emitted from one of the four light emitting devices 300, which is adjacent to the display part 20, is emitted to the upper side of the display part 20 and then reflected by the reflection body moved on the display part 20.

The angle of the light emitting device 300 which is disposed to be inclined may be controlled properly according to the emission range of the light emitted from the light emitting device 300.

The light emitting device 300 is an IR(Infrared Rays) LED which emits infrared light.

The infrared light emitted from the light emitting device 300 to the upper side of the display part 20 is reflected to the light receiving device 200 by the reflection body which is moved on the display part 20.

The reflection body may be a part of a user's body or various tools moved by the user, which are moved on the display part 20 in order to operate the portable terminal equipped with the motion sensing switch S.

As shown in FIG. 5, the compensation device 400 is mounted on the circuit board 130 so as to be adjacent to the light receiving device 200 and to emit infrared light to the light receiving device 200.

The compensation device 400 is disposed at the lower side of the through-hole 121 together with the light receiving device 200.

If necessary, the compensation device 400 may be not disposed at the lower side of the through-hole 121.

As described above, the compensation device 400 emits the light to the light receiving device 200, and the light receiving device 200 receives and senses the light emitted from the light emitting device 300 and reflected from the reflection body and emitted from the compensation device 400, and the current generated by the received light is transferred to the control device.

Detailedly, the compensation device 400 emits the light according to brightness of the surrounding environment so that the light receiving device 200 can sense constant intensity of the light.

In other words, since changes in the surrounding environment such as indoor illumination, outdoor weather and a tunnel causes a change in a light source which is sensed by the light receiving device 200, the compensation device 400 emits the light to the light receiving device 200 according to the intensity of external light.

Thus, the control part can obtain the operation signal which is corresponding to a current value compensated by the compensation device 400.

The control part (not shown) is mounted on the circuit board 130 and electrically connected with the light receiving device 200 and the light emitting device 300.

The control part operates the light emitting device 300 so as to emit the light.

The control device operates each of the four light emitting devices 300 so that the four light emitting devices 300 are repeatedly operated in turn.

Further, the control device receives the operation signal corresponding to the current generated from the light receiving device 200 and controls the portable terminal according to the movement of the reflection body.

As described above, the light emitting device 300 may be disposed to be not inclined with respect to the light receiving device 200. However, in the embodiment, since the second inclined portion 123 is provided so that the light emitting device 300 is disposed to be inclined with respect to the light receiving device 200, it is minimized even in a long distance away that the light emitted from the light emitting device 300 is overlapped, and thus it is facile to distinguish from which light emitting device the light sensed by the light receiving device 200 is emitted.

FIG. 8a is a view when seeing in a z-axial direction of FIG. 6, wherein a light receiving range of the light receiving device 200 and a light emitting range of the light emitting device 300 are shown.

FIG. 8b is a view showing that the second inclined portion 123 is formed to be parallel with the circuit board 130, wherein the light receiving range of the light receiving device 200 and the light emitting range of the light emitting device 300 are shown as like in FIG. 8a.

If the light emitting device is disposed to be inclined in an opposite direction to the light receiving device 200, it is minimized that the light emitting range T of the light emitting device 300 is overlapped within the light receiving range R of the light receiving device 200, even when it is far away from the motion sensing switch S, as shown in FIG. 8a.

However, as shown in FIG. 8b, if the light emitting device is not disposed to be inclined in the opposite direction to the light receiving device 200, the overlapped portion of the light emitted from the light emitting device 300 is increased, as it is far away from the motion sensing switch S. If the reflection body is located at the overlapped portion, it is difficult to check an exact position of the reflection body.

Therefore, in the embodiment, the light emitting device is disposed to be inclined with respect to the light receiving device 200 so that the overlapped portion in the light emitting range T of the light emitting device 300 can be minimized. Thus, the control part judges the movement of the reflection body on the display part 20 according to the operation signal corresponding to the light sensed by the light receiving device 200 and easily controls the portable terminal.

As described above, since the light receiving device 200 is disposed to be inclined toward the display part 20 and the light emitting device 300 is disposed to be inclined in the opposite direction to the light receiving device 200, it is possible to increase the recognition rate of the external motion from a long distance away and also to sensitively response the external motion, thereby conveniently controlling the portable terminal in the non-contact type.

Hereinafter, a method of operating the motion sensing switch S according to the present invention, as described above, will be described.

The control part operates repeatedly the light emitting devices 300 in turn so as to emit the light to the upper side of the motion sensing switch.

If the display part 20 of the portable terminal has a wide width, a light sensing range in which the motion sensing switch S disposed outside the display part 20 senses the motion of the reflection body is formed at the upper side of the motion sensing switch, and thus a user has to perform the control motion at an outside of the display part 20 but not the upper side of the display part 20.

However, in the embodiment as described above, since the light receiving device 200 is disposed to be inclined toward the display part 20 and the light emitting device 300 is disposed to be inclined in the opposite direction to the light receiving device 200, the light emitting device 300 emits the light to the upper side of the display part 20 and the light receiving device 200 senses the light reflected by the reflection body moved on the display part 20, and thus it is facile to sense the movement of the reflection body from a long distance away and also it is inconvenient for a user to operate the portable terminal while watching the display part 20.

Since the light emitting device 300 is operated in turn by the control device, it is facile to distinguish the light emitted from the four light emitting devices 300.

The light emitted from one of the light emitting devices 300 is reflected by the reflection body and then sensed by the light receiving device 200, and the intensity of the light reflected by the reflection body is changed according to the movement of the reflection body.

As described above, while the intensity of the light emitted from one of the light emitting devices 300 and reflected by the reflection body is changed, the light emitted from the rest light emitting devices 300 is not reflected by the reflection body and thus cannot be sensed by the light receiving device 200, or even though the light emitted from the rest light emitting devices 300 is reflected by the reflection body and then sensed by the light receiving device 200, the change in the intensity thereof is small, and thus the control device can distinguish and ascertain the light emitting device 300, which emits the light reflected by the reflection body and sensed by the light receiving device 200, on the basis of the change in the current generated by the light sensed by the light receiving device 200, i.e. the intensity of the operation signal Therefore, the control part can ascertain the position and movement of the reflection body moved on the display part 20.

In other words, the light receiving device transfers to the control device the operation signal corresponding to the current generated by sensing the light reflected from the reflection body, and the control device analyzes the intensity and characteristic of the signal on the basis of the operation signal and checks the position and movement of the reflection body on the display part 20, thereby operating the portable terminal with the motion sensing switch S according to the motion of the reflection body.

More detailedly, as shown in FIG. 8a, the light emitting device 300 includes a first light emitting device 300a, a second light emitting device 300b, a third light emitting device 300c and a fourth light emitting device 300d. If the reflection body on the display part 20 is moved from the first light emitting device 300a to the third light emitting device 300c, the intensity of the light emitted from the first light emitting device 300a and sensed by the light receiving device 200 is increased and then reduced, and the intensity of the light emitted from the third light emitting device 300c and sensed by the light receiving device 200 is increased and then reduced.

As described above, the light receiving device 200 generates the operation signal according to the change in the intensity of the light emitted from the first and second light emitting devices 300a and 300c. The control device receives the operation signal and recognizes that the reflection body is moved in a y axial direction, i.e., from the first light emitting device 300a to the third light emitting device 300c.

Meanwhile, when the reflection body is moved from the third light emitting device 300c to the first light emitting device 300a, the intensity of the light emitted from the third light emitting device 300c is firstly changed and the intensity of the light emitted from the first light emitting device 300a is then changed.

Further, if the reflection body is moved from the second light emitting device 300b to the fourth light emitting device 300d, the intensity of the light emitted from the second light emitting device 300b and sensed by the light receiving device 200 is increased and then reduced, and the intensity of the light emitted from the fourth light emitting device 300d and sensed by the light receiving device 200 is increased and then reduced.

Thus, the control device recognizes that the reflection is moved in an x axial direction.

And an up/down movement of the reflection body can be recognized by complexly judging the y axial movement of the reflection body and the change in the intensity of the light emitted from the light emitting device 300, reflected by the reflection body and sensed by the light receiving device 200.

In other words, since the motion sensing switch S is disposed to be inclined in the portable terminal, the up/down movement of the reflection body is similar to the y axial movement of the reflection body, and also when the reflection body is moved up and down, as a distance between the reflection body and the light receiving device 200 becomes long, the intensity of light sensed by the light receiving device 200 becomes weak. And as the distance between the reflection body and the light receiving device 200 becomes short, the intensity of light sensed by the light receiving device 200 becomes strong. Therefore, when the control device senses the y axial movement of the reflection body, and at the same time, the intensity of the light sensed by the light receiving device 200 is increased or reduced, it is determined that the reflection body is moved up and down.

As described above, the control device can recognize the three-dimensional motion of the reflection body and thus can operate the apparatus with the motion sensing switch S according to the movement of the reflection body.

In the motion sensing device S as described above, the light receiving device 200 is disposed to be inclined toward the display part 20, and the light emitting device 300 is disposed to be inclined in the opposite direction to the light receiving device 200 so as to emit the light to the upper side of the display part 20, and thus it is possible to increase the recognition rate of the external motion from a long distance away and also to sensitively response the external motion, thereby conveniently controlling the portable terminal on the display part 20 in the non-contact type.

Thus, the motion sensing switch S can be applied to the portable terminal so as to conveniently control it on the display part 20 without any touching of it.

According to the motion sensing switch of the present invention, since the light receiving device is disposed to be inclined toward the display part, and the light emitting device is disposed to be inclined in the opposite direction to the light receiving device, it is possible to increase the recognition rate of the external motion from a long distance away and also to sensitively response the external motion, thereby conveniently controlling the portable terminal in the non-contact type.

Further, since the second inclined portions are formed to be inclined at the same angle so that each light emitting device is disposed to be inclined at the same angle, the distance in which the light emitted from each light emitting device is not overlapped is increased, and thus the range which can sensitively sense the motion of the reflection body is increased.

While the present invention has been described with respect to the specific embodiments, it will be apparent to those skilled in the art that various changes and modifications may be made without departing from the spirit and scope of the invention as defined in the following claims.

What is claimed is:

1. A motion sensing switch, which recognizes motion of a reflection body moved at an upper side of a display part of a portable terminal and controls the portable terminal, comprising:

a base which is disposed at an upper side of a main body of the portable terminal having the display part, which is outside the display part;

a light receiving device which is disposed at the base;

a plurality of light emitting devices which are disposed at the base so as to be symmetric with respect to the light receiving device; and a control device which operates the light emitting devices, wherein the light receiving device is disposed to be inclined toward the display part, and the light receiving device senses light emitted from the light emitting devices and reflected by the reflection body and transfers an operation signal to the control device, and the light emitting devices are disposed to be inclined in an opposite direction to the light receiving device, and the control device receives the operation signal and recognizes motion of the reflection body; and wherein the portable terminal is formed with a mounting groove in which the base is inserted, and the base comprises a first base which is inserted into the mounting groove and formed with a first inclined portion formed thereon to be inclined downward toward the display part; a second base which is installed at the first inclined portion and which has a through-hole formed at a center portion thereof and a second inclined portion formed around the through-hole to be inclined in an opposite direction to the through-hole; and a circuit board which is disposed between the first and second bases and on which the light receiving device is mounted, and the light receiving device is disposed at a lower side of the through-hole so as to sense the light emitted from the light emitting device through the through-hole, and the light emitting device is coupled to the second inclined portion and disposed to be inclined in an opposite direction to the light receiving device.

2. The motion sensing switch of claim 1, wherein the second inclined portion is provided at four positions and disposed around the through-hole to be arranged at an angular interval of 90°.

* * * * *